(12) United States Patent
Hurbi et al.

(10) Patent No.: US 9,964,363 B2
(45) Date of Patent: May 8, 2018

(54) HEAT PIPE HAVING A PREDETERMINED TORQUE RESISTANCE

(71) Applicant: Microsoft Technology Licensing, LLC, Redmond, WA (US)

(72) Inventors: Erin Hurbi, San Francisco, CA (US); Joe Taylor, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 15/163,608

(22) Filed: May 24, 2016

(65) Prior Publication Data

US 2017/0343293 A1 Nov. 30, 2017

(51) Int. Cl.
*F28D 15/00* (2006.01)
*F28D 15/02* (2006.01)
(Continued)

(52) U.S. Cl.
CPC ..... *F28D 15/0241* (2013.01); *F28D 15/0275* (2013.01); *F28D 15/046* (2013.01); *F28F 21/082* (2013.01); *F28F 21/084* (2013.01); *F28F 21/085* (2013.01); *F28F 21/086* (2013.01); *F28F 21/087* (2013.01); *F28D 2021/0028* (2013.01); *G06F 1/163* (2013.01); *G06F 1/1681* (2013.01)

(58) Field of Classification Search
CPC ............ F28D 15/0241; F28D 15/0275; F28D 15/046; F28D 2021/0028; F28F 21/082; F28F 21/084; F28F 21/085; F28F 21/086; F28F 21/087; G06F 1/163; G06F 1/1681
USPC .................................................. 165/104.26
See application file for complete search history.

(56) References Cited

U.S. PATENT DOCUMENTS 3,604,504 A 9/1971 Kessler, Jr. et al.
3,913,665 A 10/1975 Franklin et al.
(Continued)

OTHER PUBLICATIONS

Aliexpress, "Copper Flat Heat Pipe Thickness3.0 Width8.0 Length150 Heat Pipe Diy Customize", Retrieved on: Oct. 31, 2015, Available at: http://www.aliexpress.com/item/ Copper-flat-heat-pipe-thickness3-0-width8-0-length150-heat-pipe-diy-stomize/32448363094.html, 3 pages.
(Continued)

*Primary Examiner* — Davis Hwu
(74) *Attorney, Agent, or Firm* — Newport IP, LLC; Scott Y. Shigeta

(57) ABSTRACT

Technologies provide a heat pipe having a controlled torque resistance. The techniques disclosed herein provide a heat pipe that can function as a coupling device and as a thermal interface between two moving components of a device without the need of a mechanical hinge. In some configurations, a heat pipe comprises a housing having an outer surface and having an inner surface defining a cavity. The heat pipe can also comprise one or more components for transferring heat from a first region to a second region. In addition, the heat pipe is configured to provide a predetermined torque resistance about a first axis that is perpendicular to a longitudinal axis of the heat pipe. Components, such as a heat source and a heat sink, that are attached to the heat pipe can be hingeably coupled with a predetermined torque resistance without requiring a hinge and a separate thermal interface device.

14 Claims, 13 Drawing Sheets

(51) Int. Cl.
    *F28D 15/04*     (2006.01)
    *F28F 21/08*     (2006.01)
    *F28D 21/00*     (2006.01)
    *G06F 1/16*     (2006.01)

(56) References Cited

U.S. PATENT DOCUMENTS

| | | |
|---|---|---|
| 4,461,343 A | 7/1984 | Token et al. |
| 5,598,320 A | 1/1997 | Toedtman et al. |
| 5,718,282 A | 2/1998 | Bhatia et al. |
| 5,910,883 A | 6/1999 | Cipolla et al. |
| 6,065,529 A * | 5/2000 | Antoniuk ............ B64G 1/50 |
| | | 165/104.26 |
| 6,184,578 B1 * | 2/2001 | Gardner ............ H01L 23/427 |
| | | 257/712 |
| 6,330,907 B1 * | 12/2001 | Ogushi ............ F28D 15/043 |
| | | 165/104.26 |
| 6,816,371 B2 | 11/2004 | Agata et al. |
| 6,871,701 B2 | 3/2005 | Ueki et al. |
| 7,746,631 B2 | 6/2010 | Ali |
| 2003/0159808 A1 * | 8/2003 | Hoang ............ F28D 15/043 |
| | | 165/104.26 |
| 2005/0180109 A1 | 8/2005 | Miyazaki et al. |
| 2007/0151708 A1 | 7/2007 | Touzov |
| 2007/0227704 A1 | 10/2007 | Nagai et al. |
| 2009/0071632 A1 | 3/2009 | Bryant et al. |
| 2012/0160457 A1 | 6/2012 | Kim et al. |

OTHER PUBLICATIONS

Hornyak, Tim, "Fujitsu's Thin Heat Pipe Could Let Smartphone Chips Run Cooler", Published on: Mar. 13, 2015, Available at: http://www.computerworld.com.au/ article/570335/fujitsu-thin-heat-pipe-could-let-smartphone-chips-run-cooler/, 3 pages.

Supaflex, "Axial & Articulated Expansion Joints", Published on: Sep. 3, 2014, Available at: http://www.supaflex.com/axial-articulated-expansion-joints, 3 pages.

* cited by examiner

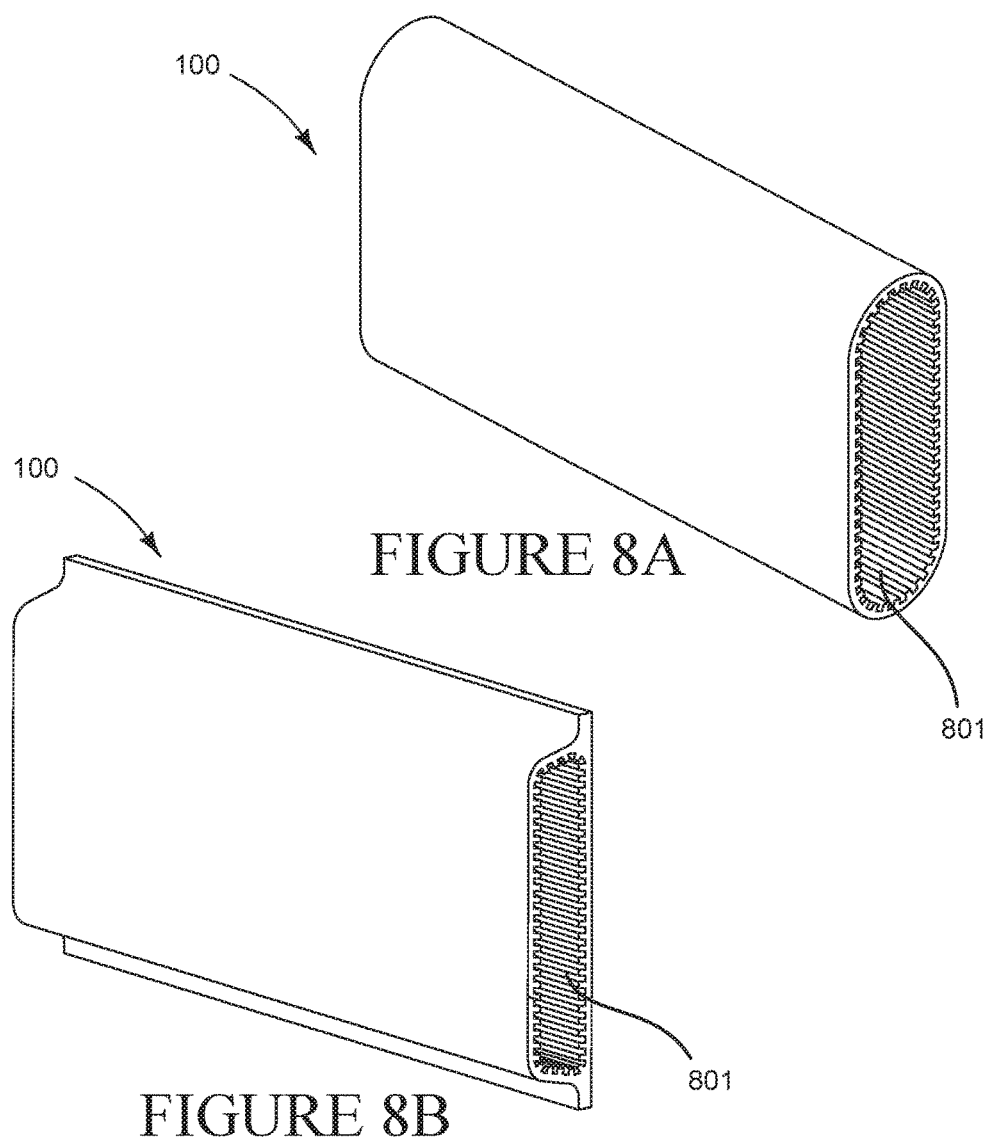
FIGURE 8A
FIGURE 8B
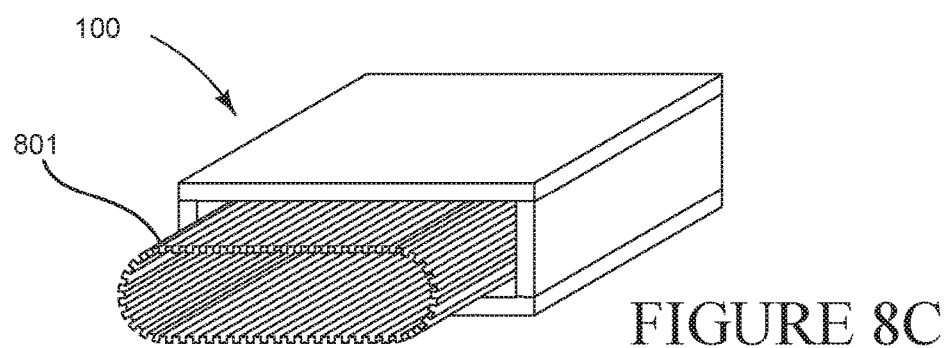
FIGURE 8C

HEAT PIPE HAVING A PREDETERMINED TORQUE RESISTANCE

BACKGROUND

Thermal management and weight management are key considerations in the design of wearable devices. Such considerations can present challenges to designers of a head-mounted display (HMD), a watch, or any other device that is designed to use in close proximity to an individual without significantly hampering their mobility. Further, such design challenges become more difficult when a wearable device includes movable components that enable a device to provide a range of conforming shapes and sizes.

When a design specification requires thermal management of moving components, some current design methodologies utilize both a hinge and a heat pipe. For example, some laptop designs include both a heat pipe and a spring loaded hinge to connect a heat sink in the display assembly to the main processing assembly. Designs using these separate components have served the industry well, however, such configurations do not offer optimal performance specifications when it comes to both thermal management and weight management. Such designs leave much to be desired when it comes to serving these two goals, particularly when it comes to wearable devices.

It is with respect to these and other considerations that the disclosure made herein is presented.

SUMMARY

Technologies described herein provide a heat pipe having a predetermined torque resistance. More specifically, the techniques disclosed herein provide a heat pipe that can function as a coupling device and as a thermal interface between two moving components of a device without a mechanical hinge. In some configurations, a heat pipe comprises a housing having an outer surface and having an inner surface defining a cavity. The heat pipe can also comprise one or more components for transferring heat from a first region to a second region. In addition, the heat pipe is configured to provide a predetermined torque resistance about a first axis that is perpendicular to a longitudinal axis of the heat pipe.

The thickness, shape, and the material composition of the housing are configured to create the controlled torque resistance as an external force rotates the first region of the heat pipe about an axis that is positioned between the first region and the second region of the heat pipe. The torque resistance (T) can be measured by any suitable unit of measure, e.g., Newton-centimeters, which in some configurations can be constant within a predetermined range of rotation. The thickness, shape, and the material composition of the heal pipe are configured to enable the heat pipe to be bent in either direction about the axis.

When a first region of the heat pipe is coupled to a first component of a device, such as a memory chip or a processor, and a second region of the heat pipe is coupled to a second component of the device, such as a heat sink, the heat pipe can function as a thermal interface transferring heat between the components. In some configurations, the heat pipe is configured to bend within a third region thereby hingeably coupling the first component and the second component. As will be described in more detail below, the heat pipe can cause the first component to rotate about an axis positioned between first component and the second component, where the first component can rotate about the axis having a predetermined, e.g. a controlled level of, torque resistance.

When the heat pipe is used in a wearable computing device, the wearable computing device can have one or more moving parts that provide a predetermined level of torque resistance. Heat can be transferred between the parts as well as providing a desired amount of torque resistance to hold a part of the device in a particular position. The part can be moved to a second position within a given range of motion when an external force is applied to the part. Articles of manufacture that utilize a heat pipe configured in accordance with the techniques disclosed herein can have a reduced weight versus articles that utilize both a heat pipe and a hinge.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures in the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIGS. 8A-8C are perspective views of several heat pipe configurations comprising one or more components for transferring heat.

DETAILED DESCRIPTION

Figure 1A:
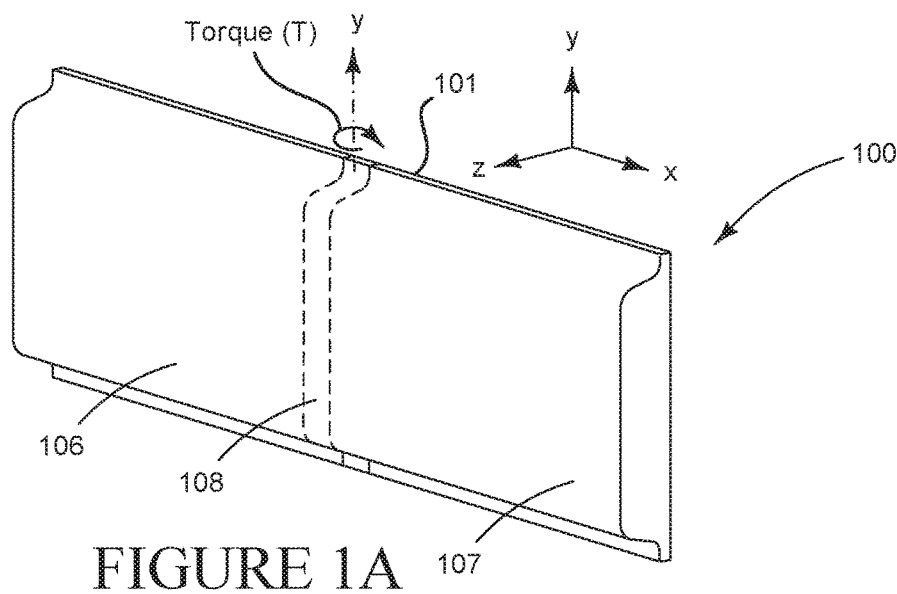
FIG. 1A is a perspective view of a heat pipe configured in accordance with the techniques disclosed herein.
Figure 1B:
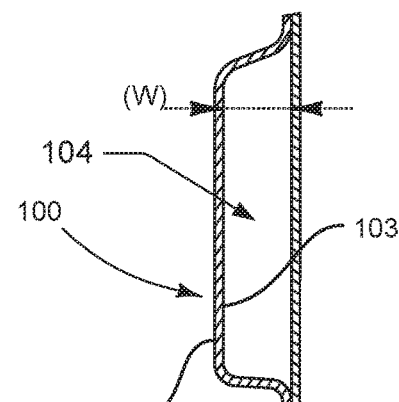
FIG. 1B is a cross-section of the heat pipe shown in FIG. 1A.
Figure 1C:
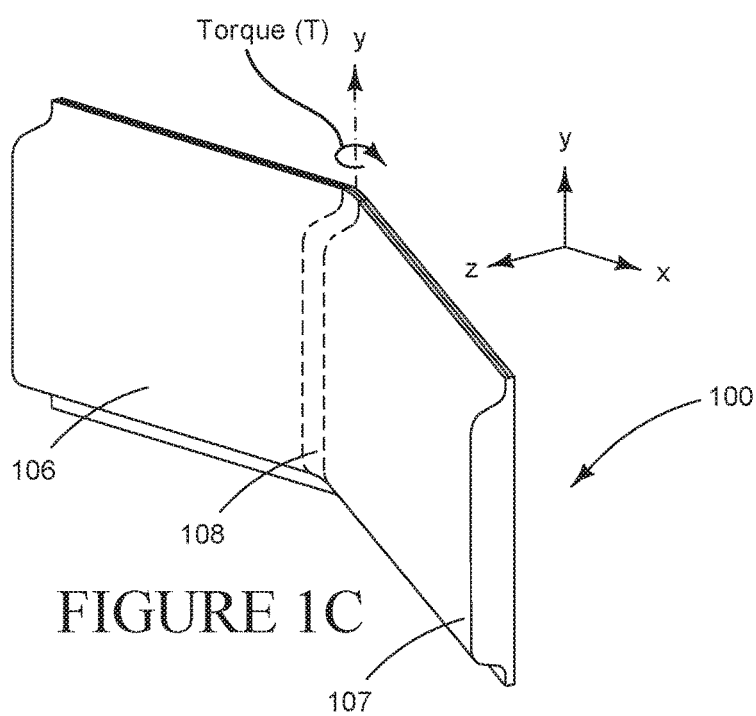
FIG. 1C is a perspective view of the heat pipe shown in FIG. 1A bent about an axis.

FIGS. 1A-1C illustrate an example heat pipe 100 configured in accordance with the techniques disclosed herein. In this illustrative example, the heat pipe 100 comprises a housing 101 having an outer surface 102 and an inner surface 103 defining a cavity 104 having a cavity width (W). In this example, the heat pipe 100 comprises a first region 106, a second region 107, and a third region 108. As will be described in more detail below, the configurations disclosed herein comprise a material composition capable of transferring heat between the first region 106 and the second region 108. Also described in more detail below, the heat pipe 100 can also include one or more components for transferring heat the between the first region 106 and the second region 107.

The thickness, shape, size, and/or the material composition of the housing 101 are configured to provide a predetermined torque resistance (T) about a first axis (Y-Axis). The torque resistance can be measured by a suitable unit of measure, such as Newton-centimeters. In some configurations, the first axis is positioned between the first region 106 and the second region 107. The first axis can be perpendicular to a second axis (X-Axis) of the heat pipe 100, where the second axis is along a longitudinal length of the heat pipe 100. As will be described in more detail below, fasteners can be used to control the size of a third region 108 where the housing 101 bends. In some configurations, the position of one or more fasteners can also influence size of the third region 108 and the torque resistance about the first axis.

In this example, as an external force is applied to move the second region 107 in a direction around the first axis, the heat pipe 100 bends within the third region 108. In some configurations, the first axis can be between the first region 106 and the second region 107. In addition, in some configurations, the torque resistance can be constant within a predetermined range of rotation. For example, the torque resistance can be substantially constant when the first region 106 is rotated between +15 degrees and −15 degrees from a straight position, e.g., a center position, which is shown in FIG. 1A. In another example, the torque resistance can be substantially constant when the first region 106 is rotated between +30 degrees and −30 degrees from a straight position. For illustrative purposes, a substantially constant can mean a torque resistance that varies within a predetermined threshold range, e.g., within a variation of 1%, 5%, 10%, or a variation up to 20%. Configurations disclosed herein can provide a broader or narrower range of rotation depending on the shape, thickness, size, and/or the material composition of the housing 101.

It can also be appreciated that the first region 106 can be rotated in either direction from the center position, thus, the heat pipe 100 can create a positive or negative torque resistance relative to the first axis. For illustrative purposes, a torque resistance can counterbalance an external force applied to the outer surface 102 that moves at least one region of the heat pipe 100 about the first axis.

In some configurations, depending on the shape, thickness, size, and/or the material composition of the housing 101, the torque resistance can create a centering force that biases one or more regions of the heat pipe 100 to a predetermined position, such as the straight position shown in FIG. 1A, the bent position shown in FIG. 1C or any other desired position. To achieve a torque resistance that centers one or more regions in a predetermined position, a suitable material, such as steel or titanium, can be used to form the housing, and at least one region can be bent to the desired position while a suitable heat source is applied to the third region.

The example shown in FIG. 1A-1C is provided for illustrative purposes and is not to be construed as limiting. A heat pipe 100 having other dimensions and formed in other shapes fall within the scope of the present disclosure. In addition, a heat pipe 100 can have any number of regions where the housing 101 bends having a predetermined torque resistance. Such configurations can hingeably connect any number of movable components of a device and provide such components with a predetermined torque resistance relative to one another.

Figure 2A:
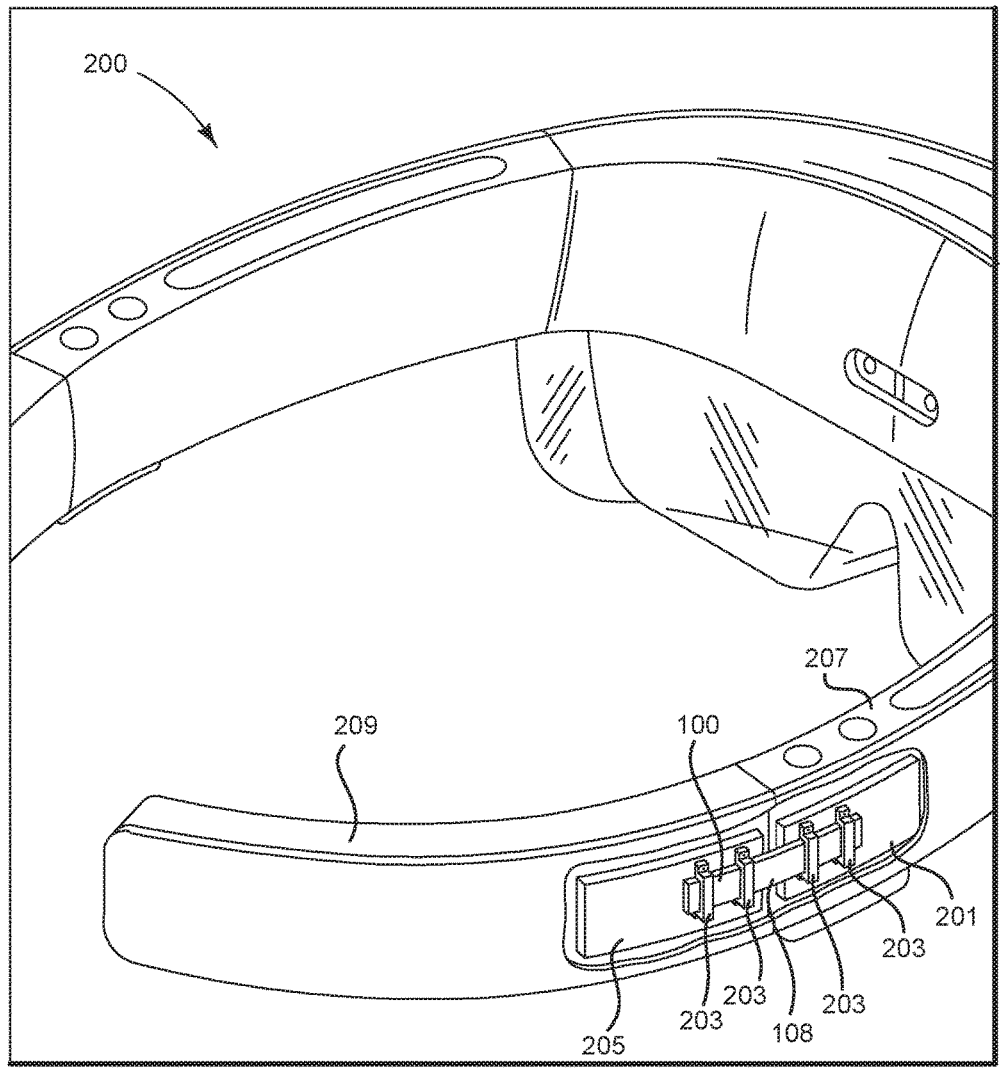
FIG. 2A is a cutaway view of an HMD having a heat pipe configured in accordance with the techniques disclosed herein.
Figure 2B:
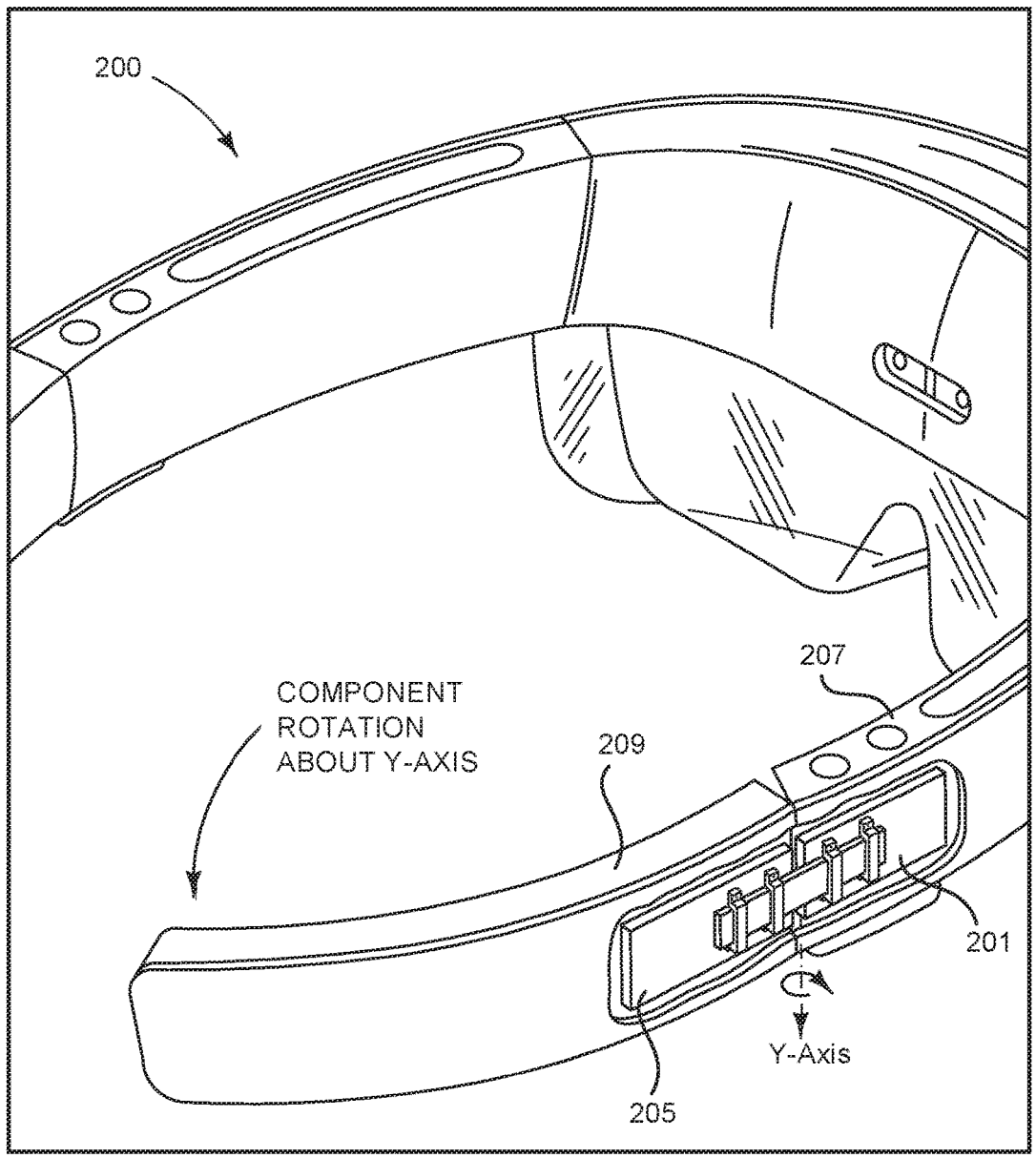
FIG. 2B is a perspective view of the HMD shown in FIG. 2A, the HMD having a heat pipe enabling a component of the HMD to be rotated about an axis while providing a predetermined torque resistance.

As summarized above, a heat pipe 100 can couple two or more components of a computing device. To illustrate such aspects, FIG. 2A shows a cutaway view of an HMD 200 showing a heat pipe 100 configured in accordance with the techniques disclosed herein, and FIG. 2B shows a component 207 of the HMD 200 that is rotated about an axis. In this example, the HMD 200 comprises a first component 201 and a second component 205. For illustrative purposes, the first component 201 can include a memory device, a motherboard, a processor, a protective shell of a memory device, a protective shell of a motherboard, a protective shell of a processor, or any other component that generates heat. The second component 205 can include a heat sink or another component for absorbing or distributing heat. Also shown in FIG. 2A, the first component 201 is coupled to a first portion 209 of the HMD 200, which in this example, is the frame of the HMD 200. In addition, the second component 205 is coupled to a second portion 209 of the HMD 200, which in this example, is a head fitting unit of the HMD 200.

In this example, the heat pipe 100 is coupled to the first component 201 and the second component 205 by a number of fasteners 203. The heat pipe 100 is in contact with the first component 201 and the second component 205, the contact enabling the heat pipe 100 to function as a thermal interface transferring heat between the components.

In some configurations, the heat pipe 100 can bend within a region, such as the third region 108 shown in FIGS. 14 and 1C. The size of the third region 108 can be based, at least in part, on the position of the fasteners 203. For example, the size of the third region 108 can be reduced if the fasteners 203 surrounding the third region 108 are moved toward one another. The size of the third region 108 can also influence the torque resistance provided by the heat pipe 100. In one illustrative example, the torque resistance of the heat pipe 100 can increase as the fasteners 203 surrounding the third region 108 are moved toward one another.

As shown in FIG. 2B, given that the heat pipe 100 is configured to bend within a region with a predetermined torque resistance, and given that the heat pipe 100 is fastened to components of the HMD, the second portion 209 of the HMD 200 can rotate about the axis (Y-Axis) with a predetermined torque resistance. In some configurations, the axis is positioned between first component 201 and the second component 205. Thus, the first portion 207 of the HMD 200 can be hingeably coupled to the second portion 209 of the HMD 200 thus enabling the HMD 200 to accommodate a range of conforming sizes. In addition to functioning as a hinge having a predetermined torque resistance, the heat pipe 100 can also transfer heat between the first component 201 and the second component 205.

Figure 3A:
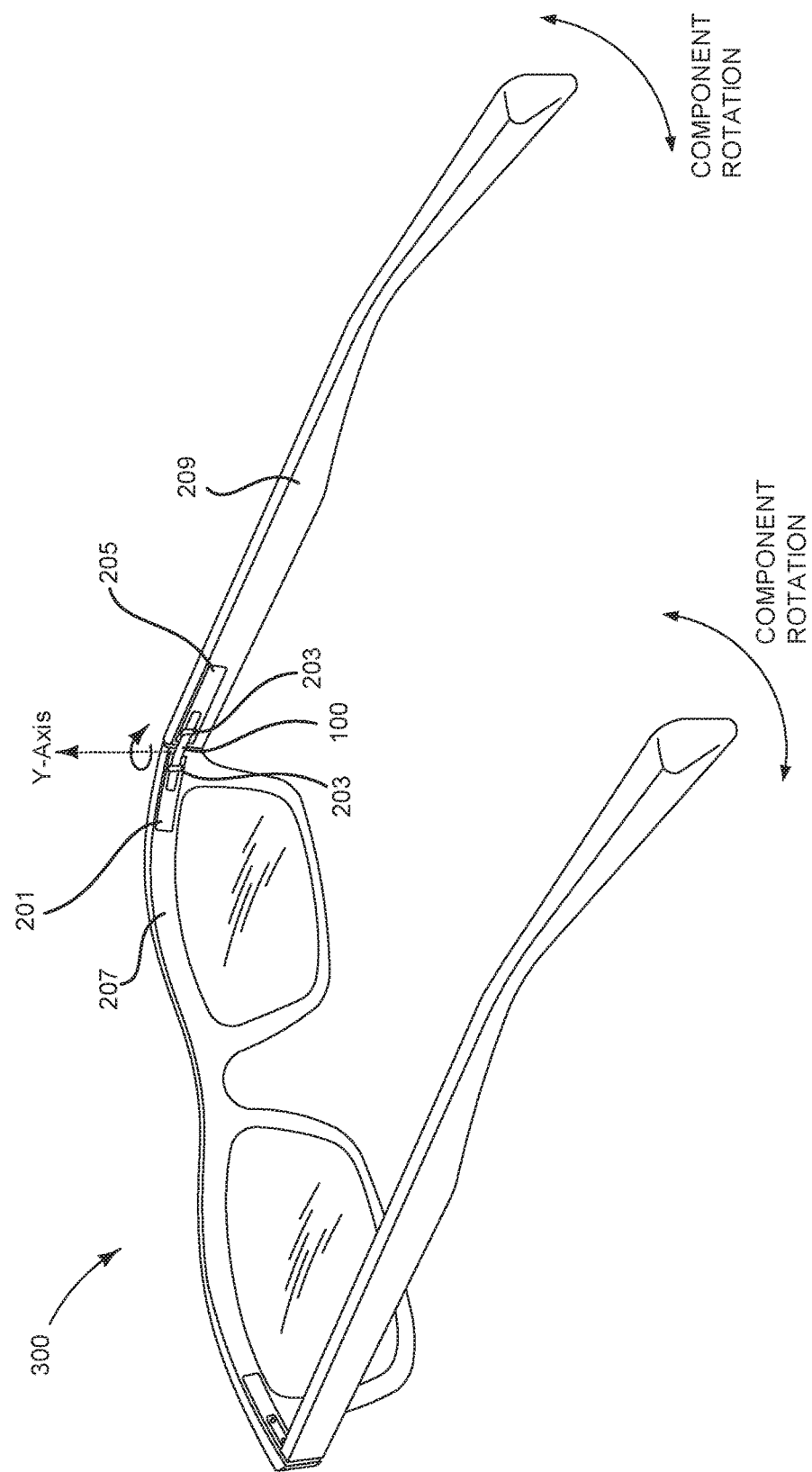
FIG. 3A is a perspective view of a wearable computing device having a heat pipe configured in accordance with the techniques disclosed herein.
Figure 3B:
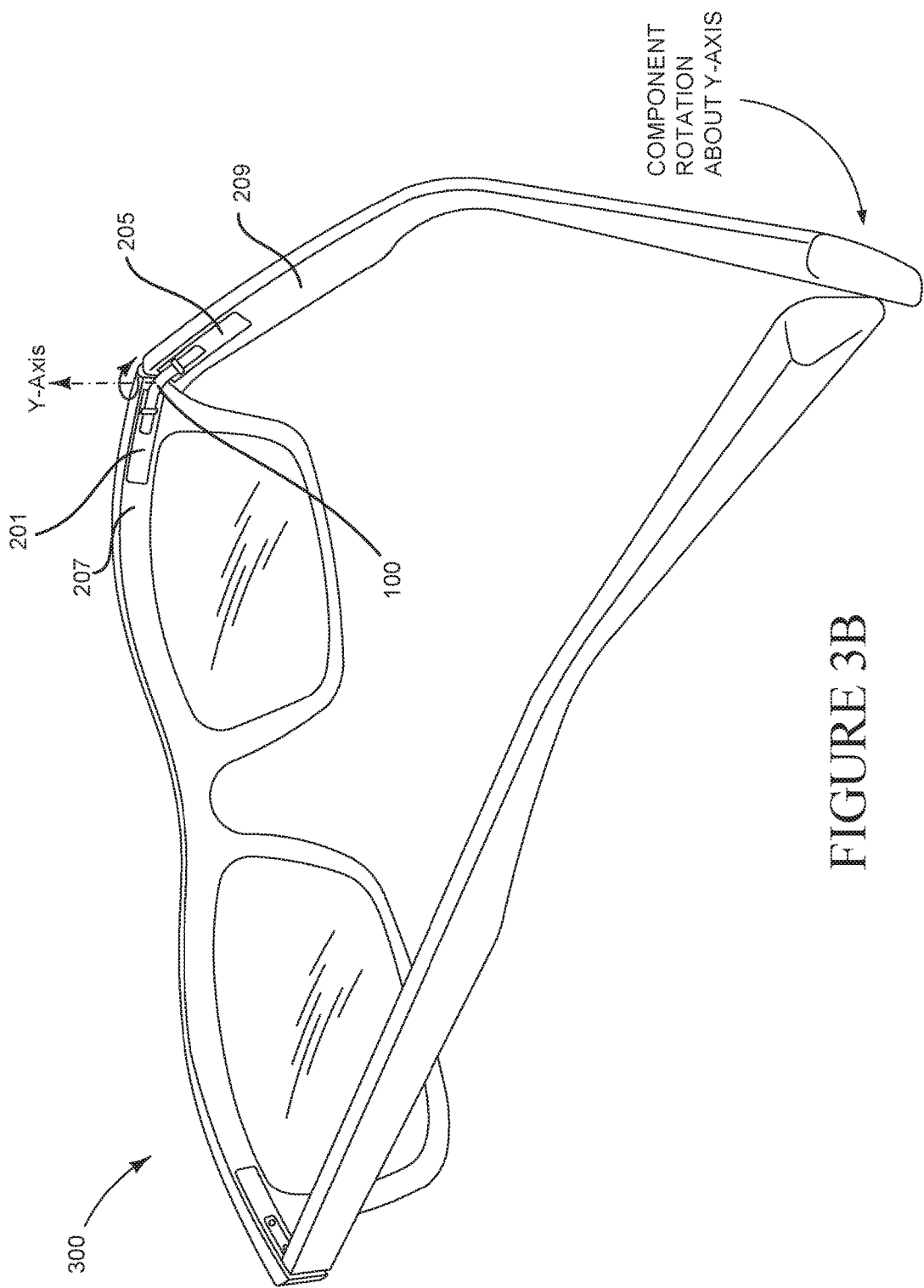
FIG. 3B is a perspective view of the wearable computing device shown in FIG. 3A, the wearable computing device having a heat pipe enabling a component of the wearable computing device to be rotated about an axis while providing a predetermined torque resistance.

FIGS. 3A and 3B illustrates another example where a heat pipe 100 is utilized in a wearable computing device 300 ("device 300") in the form of a pair of glasses. In this example, the device 300 includes a number of computing components which include a heat source 201 and a heat sink 205. The heat pipe 100 can be attached to the heat source 201 and the heat sink 205 by two or more fasteners 203. Also shown in FIG. 3A, the heat source 201 is coupled to a first portion 207 of the device 300, which in this example, is the rim of the glasses. In addition, the heat sink 205 is coupled to a second portion 209 of the device 300, which in this example, is the temple arms of the glasses.

As described above, the heat pipe 100 is configured to bend with a predetermined torque resistance. When a first region of the heat pipe 100 is fastened to the heat source 201 and the second region of the heat pipe 100 is coupled to the heat sink 205, the heat pipe 100 enables the heat sink 205 to rotate about an axis (Y-Axis) with a predetermined torque resistance. In some configurations, the axis is positioned between heat source 201 and the heat sink 205. Thus, the second portion 209 of the device 300 is hingeably coupled to a first portion 207 to enable the device 300 to fold the temple arms and accommodate more conforming sizes. In addition to functioning as a hinge having a predetermined torque resistance, the heat pipe 100 can also transfer heat between the heat source 201 and the heat sink 205.

The fasteners 203 can include any material or device suitable for fastening a heat pipe 100 to the components of a device. In some examples, the fasteners 203 can include metal strips or an adhesive. As shown in FIG. 2A and FIG. 2B, the fasteners 203 can comprise metal strips positioned around the heat pipe 100, where the ends of the metal strips are secured to one or more components by the use of screws, rivets, bolts, or an adhesive. Alternatively, or in addition to a mechanical device, the fasteners 203 can include an adhesive, such as an epoxy. In some configurations, a thermal paste or a thermal pad is inserted between the heat pipe 100 and the components. In some configurations, a solder maybe utilized to fasten the heat pipe 100 to a component. Suitable sources of heat such as a laser or gas welding tool can be used to solder or weld a fastener 203 to the heat pipe 100 and one or more components. In addition, as shown in FIG. 3A and FIG. 3B, the components may be formed to embed at least a portion of the heat pipe 100 into the components to help secure the heat pipe 100 to one or more components.

With respect to the structure of a heat pipe 100, a heat pipe 100 can comprise a single material or a combination of different materials having different properties. In some configurations, a heat pipe 100 can comprise a first material having a predetermined level of structural performance. In another configuration, a heat pipe 100 can comprise a first material having a predetermined structural performance level and a second material having a predetermined level of thermal conductivity.

For illustrative purposes, a first material having a predetermined level of structural performance can include a material providing a predetermined level of torque resistance when the material is formed with given set of dimensions, a threshold tensile strength, and/or a threshold torsional strength. Any unit of measure can be used for a threshold tensile strength, and/or a threshold torsional strength. For instance, a material used for constructing the heat pipe 100 can be based, at least in part, on a threshold number of bend cycles while maintaining a predetermined level of torque resistance. In addition, a material used for constructing the heat pipe 100 can be based, at least in part, on a threshold torsional strength, or a "cycle fatigue strength," may be in the order of 10,000, 50,000, 100,000, or higher.

In some illustrative examples, a first material having a predetermined level of structural performance can include, but is not limited to, titanium, steel, or a titanium-copper alloy. Some utilized materials, such as titanium, aluminum, and steel, can have a commercial purity of one (1) or two (2). A material having a predetermined level of purity, or a commercially pure material, can extend the lifetime of the heat pipe 100 and increase the number of lifetime bends. Metals having other purity levels can be utilized to help achieve a desired torque resistance, however such metals and/or alloys can also affect the lifetime of the heat pipe 100. Although these examples utilize titanium and steel, other suitable metals that produce a similar torque resistance can be utilized. Also, although a first material can be selected based on a predetermined level of structural performance, the first material can also function to transfer heat as described herein.

In other examples, the first material having a predetermined level of structural performance can include, but is not limited to. For example: copper and copper alloys (phosphor bronze, brass, etc.), titanium and titanium alloys and nickel and nickel alloys (Inconel, monel, Nitinol), pure aluminum and aluminum alloys, Steel alloys (carbon, stainless, etc.), magnesium and magnesium alloys, polymers and polymers with metal coatings. Such materials can be utilized in any one of the configurations disclosed herein, including the configurations shown in FIGS. 4, 5, and 6.

For illustrative purposes, a material having a predetermined level of thermal conductivity can include materials having a threshold heat transfer coefficient or a threshold level of thermal conductivity. A threshold heat transfer coefficient or a threshold level of thermal conductivity can be in any range depending on a desired application. For example, a second material having a predetermined level of thermal conductivity can include copper, aluminum, or any other material having a level of thermal conductivity in the range of 50 to 500 W/(M K).

As will be described below, various configurations of the heat pipe 100 can include various combinations of materials formed in a variety of shapes. The examples described herein are provided for illustrative purposes and are not to be construed as limiting.

Figure 4:
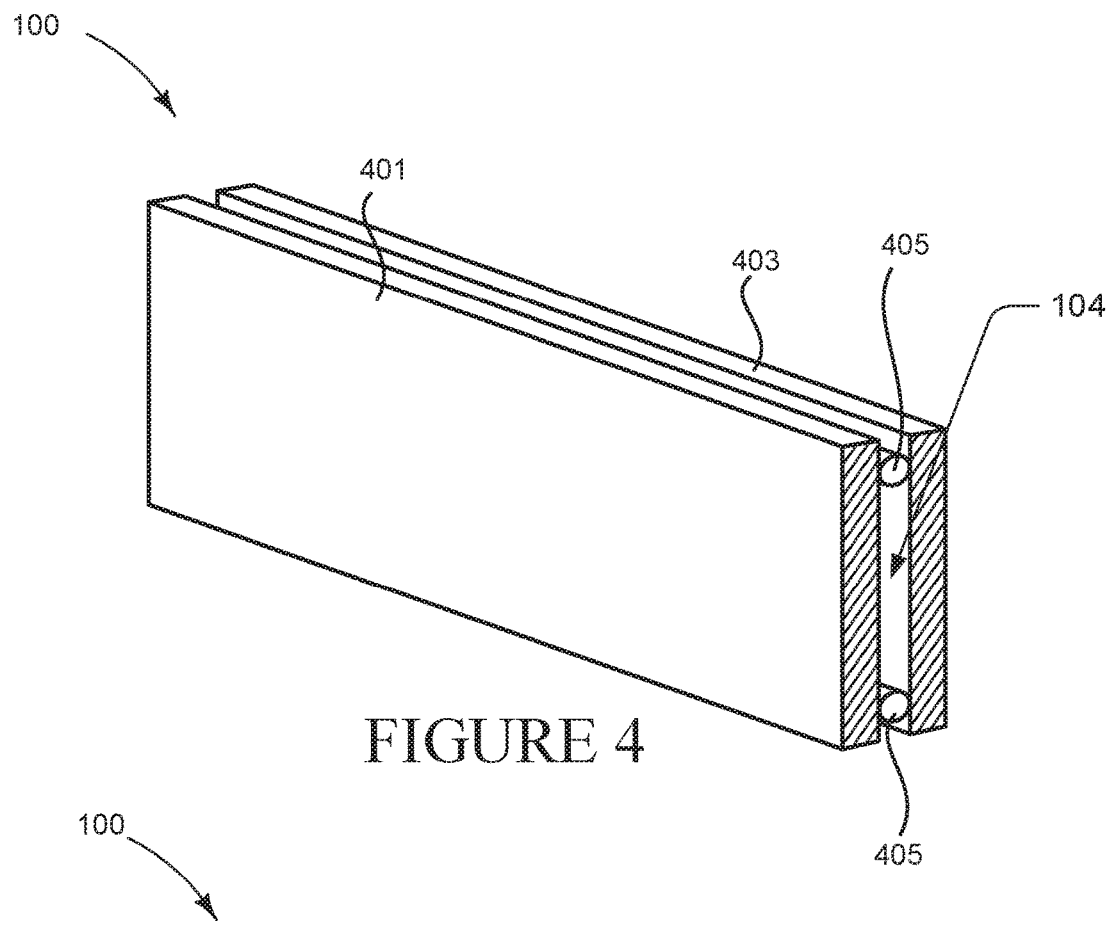
FIG. 4 is a perspective view of a heat pipe configured with a first side, a second side, and a spacer material for forming a cavity.

FIG. 4 is a perspective view of a heat pipe configured with a first side 401, a second side 403, and a spacer material 405 for forming a cavity 104. In some configurations, the first side 401 and the second side 403 can comprise a material having a predetermined level of structural performance. For instance, the first side 401 and the second side 403 can include steel, titanium or any other material having similar level of structural performance. The sides can be made from the same material or the sides can be made from different materials. For instance, both sides can be steel, or one side can be steel and the other side can be titanium.

In some configurations, one side can comprise a material having a predetermined structural performance level and the other side can comprise a second material having a predetermined level of thermal conductivity. For example, the first side 401 can comprise of titanium and the second side can comprise copper. The sides can be substantially planar.

The first side 401 and the second side 403 can be coupled using a number of suitable techniques. In addition, the spacer material 405 can be made of any number of suitable materials. For instance, the spacer material 405 can include an adhesive. For instance, the spacer material 405 can include a caulk, epoxy, or any suitable silicone-based material suitable for adhering two sections of metal together. The spacer material 405 can also include any suitable metal, plastic or other material, any of which can be fastened to both sides by the use of an adhesive or fastening material. Examples of metals that can be used as a spacer material 405 include, but are not limited to steel, titanium, copper, or an alloy, such as a titanium-copper alloy. Any suitable method for fastening a spacer material 405 to the sides, e.g., laser or gas welding or brazing, can be utilized.

Figure 5:
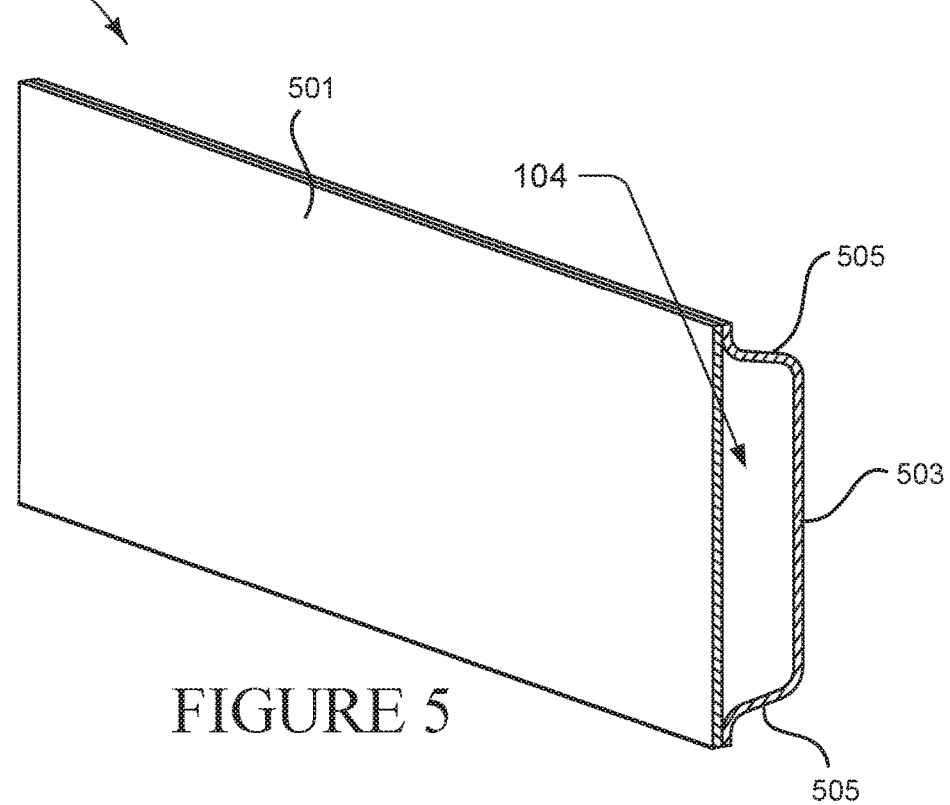
FIG. 5 is a perspective view of a heat pipe configured with a first side and a second side shaped for forming a cavity.

FIG. 5 shows a perspective view of an example heat pipe 100 configured with a planer side 501 and a shape side 503 for forming a cavity 104. In such configurations, the shape sides 503 can comprise protrusions 505 that form the cavity 104 when the planer side 501 and the shaped side 503 are placed together. In some configurations, the planer side 501 and the shaped side 503 can comprise a material having a predetermined structural performance. For instance, the planer side 501 and the shaped side 503 can include steel, titanium or any other material having similar level of structural performance. The sides can be made from the same material or the sides can be made from different materials. For instance, both sides can be steel, or one side can be steel and the other side can be titanium.

In some configurations, one side can comprise a material having a predetermined structural performance level and the other side can comprise a second material having a predetermined level of thermal conductivity. For example, the planar side 501 can comprise of titanium and the shaped side 503 can comprise copper.

The planer side 501 and the shaped side 503 can be coupled using a number of suitable techniques. For instance, the planer side 501 and the shaped side 503 can be fastened to one another by the use of an adhesive, e.g., a caulk, epoxy, or any suitable silicone-based material suitable for adhering two sections of metal together. Any suitable method for fastening the two sides together, e.g., laser or gas welding or brazing, can be utilized.

A predetermined of torque resistance (T) of a heat pipe 100 can depend, at least in part, on one or more dimensions and the material composition of the heat pipe 100. For illustrative purposes, the following section describes several example dimensions of a heat pipe 100 having a predetermined torque resistance.

In one illustrative example, a heat pipe 100 can have a height (H), in the direction of the Y-axis, in the range of 3 to 5 mm. This examples provided for illustrative purposes and is not to be construed as limiting. In another example, a height can be up to 25 mm. Any suitable height, even less than 3 mm or greater than 25 mm, can be utilized. The thickness of each side can be within any suitable range for enabling a desired torque resistance. In one illustrative example, the thickness of at least one side, e.g., a planer side and/or a shaped side, can be 0.1 mm to 0.3 mm. In some configurations, the wall thickness can approximately 100 μm and up to a half of a millimeter. Having such thicknesses enables a threshold number of bend cycles and/or a predetermined of torque resistance.

In some configurations, the cavity width (W) can measure 0.1 mm to 1.0 mm between the sides. In one illustrative example, the cavity width can be up to 2 mm. Such dimensions, and other like dimensions, can enable the heat pipe 100 to produce a desired torque resistance, which may be approximately 100 newton-centimeters. These examples are provided for illustrative purposes and are not to be construed as limiting.

Figure 6:
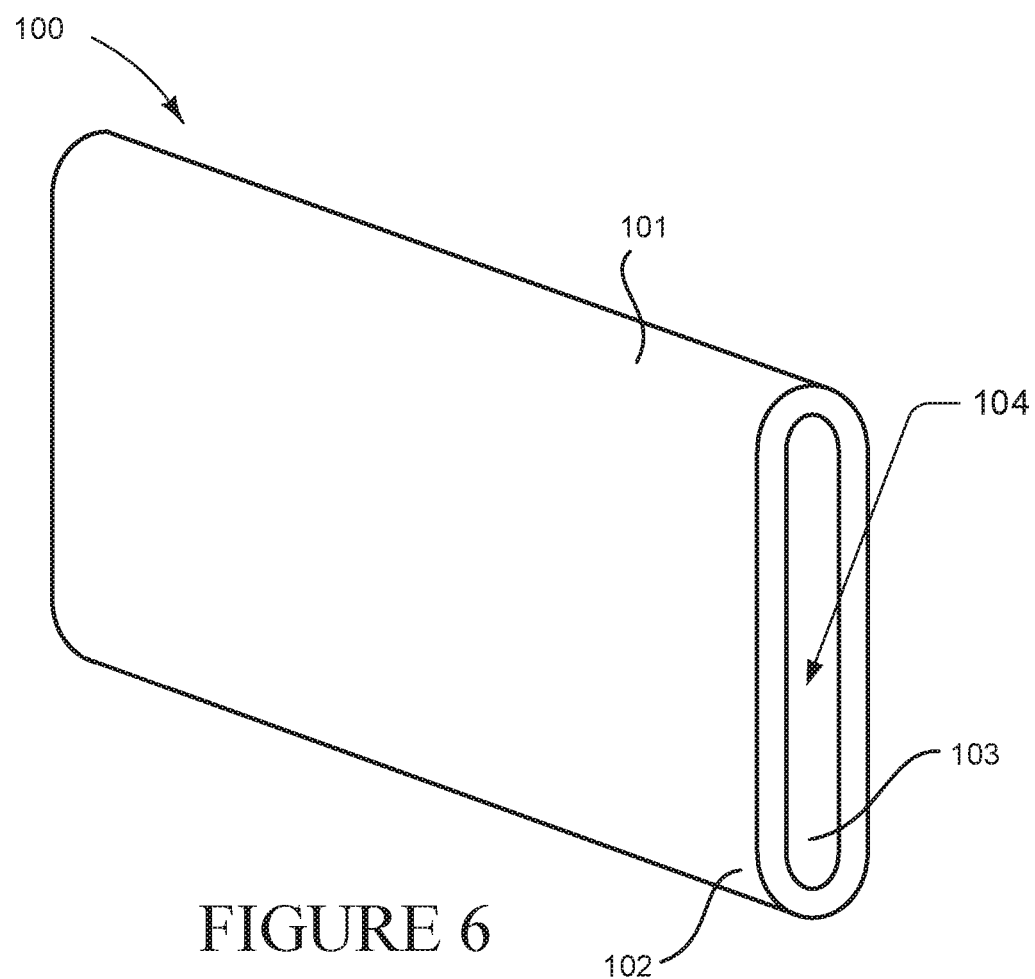
FIG. 6 is a perspective view of a heat pipe configured from a single metal section having a cavity.

FIG. 6 is a perspective view of a heat pipe 100 configured from a single section of metal. In this configuration, a single section of metal forms the housing 101 having an outer surface 102 and an inner surface 103 defining a cavity 104 having a cavity width (W). One or more processes can be utilized to form a heat pipe 100 from a single section of metal. One illustrative example, described below, involves a process that comprises providing a metal tube and shaping the metal tube to one or more dimensions providing a predetermined level of structural performance.

Figure 7A:
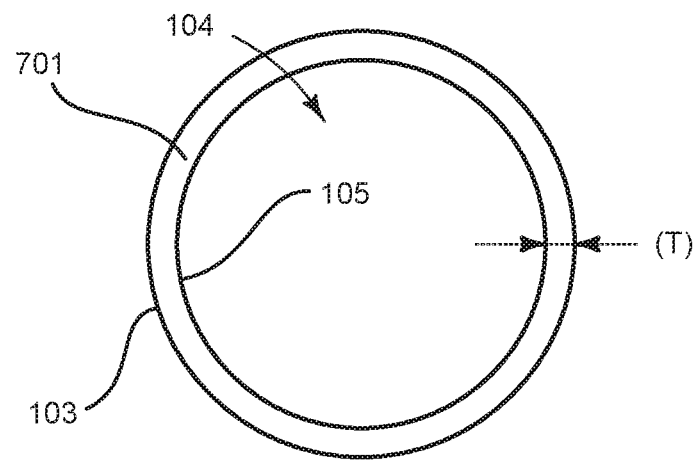
FIG. 7A is a cross-section of a material used for forming a heat pipe having a predetermined torque resistance.
Figure 7B:
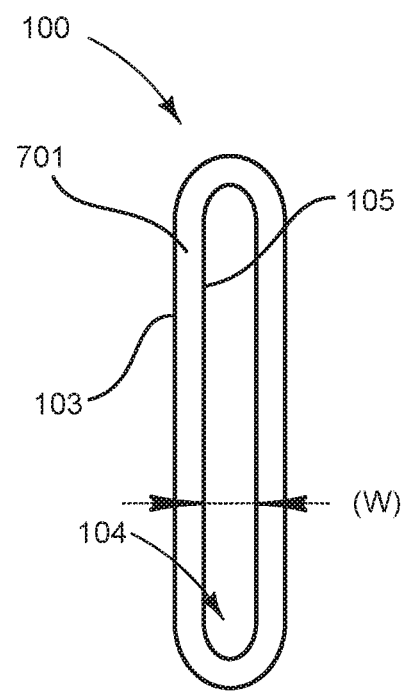
FIG. 7B is a cross-section of a heat pipe formed from the material shown in FIG. 7A.

In another illustrative example, FIGS. 7A and 7B show a heat pipe 100 that is configured from a metal tube 701 having an outer surface 103 and an inner surface 105 forming a cavity 104. In this example, the metal tube 701 having thickness (T) is shaped to form a heat pipe 100 have a predetermined cavity width (W). The metal tube 701 can comprise any suitable material, such as titanium, steel or any other metal having a predetermined level of structural performance.

The diameter of the metal tube 701 can be within any suitable range. For example, the diameter of the metal tube 701 can be 2 mm up to 8 mm. In one illustrative example, the metal tube 701 can have a diameter of 5 mm. The metal tube 701 can shaped into the heat pipe 100 using any suitable process for forming a cavity width (W) at a predetermined distance. For example, the width (W) of the cavity 104 can be less than a millimeter wide.

The thickness of the thickness (T) of the metal tube 701 can be any suitable range. In one example, the thickness (T) of the metal tube 701 can be 0.03 mm. In some configurations, the thickness (T) can be 100 μm and up to a half of a millimeter. Such dimensions can enable the heat pipe 100 to have predetermined level of structural performance, which can include a predetermined level of torque resistance and/or a predetermined cycle fatigue strength.

As summarized above, a heat pipe 100 can also comprise one or more components for transferring heat from a first region 106 to the second region 107. FIGS. 8A-8C are perspective views of several heat pipe 100 configurations comprising one or more components for transferring heat. In some configurations, the one or more components include a wicking structure 801 disposed within the cavity 104 and a working fluid (not shown). The working fluid can be any suitable fluid for producing a capillary action. In such configurations, a heat pipe 100 comprises an evaporator section and a condenser section. For illustrative purposes, the evaporator section can be the first region 106 and the evaporator section can be the second region 108.

A heat pipe 100 configured in accordance with the techniques disclosed herein can include any suitable wicking structure 801. For example, as shown in FIGS. 8A and 8B, a wicking structure 801 can be etched into, or attached to, the inner surface 105 of the housing 101. Specifically, FIG. 8A illustrates a wicking structure 801 etched into the inner surface 105 of the heat pipe 100 that is formed from a metal tube. FIG. 8B illustrates a wicking structure 801 formed into the inner surface 105 of the heat pipe 100 that is made from a planer side and shaped side. FIG. 8C is an example where a wicking structure 801, such as a metal grid, is inserted into the cavity 104. In some configurations, the wicking structure 801 can extend through the length of the cavity 104.

Figure 9A:
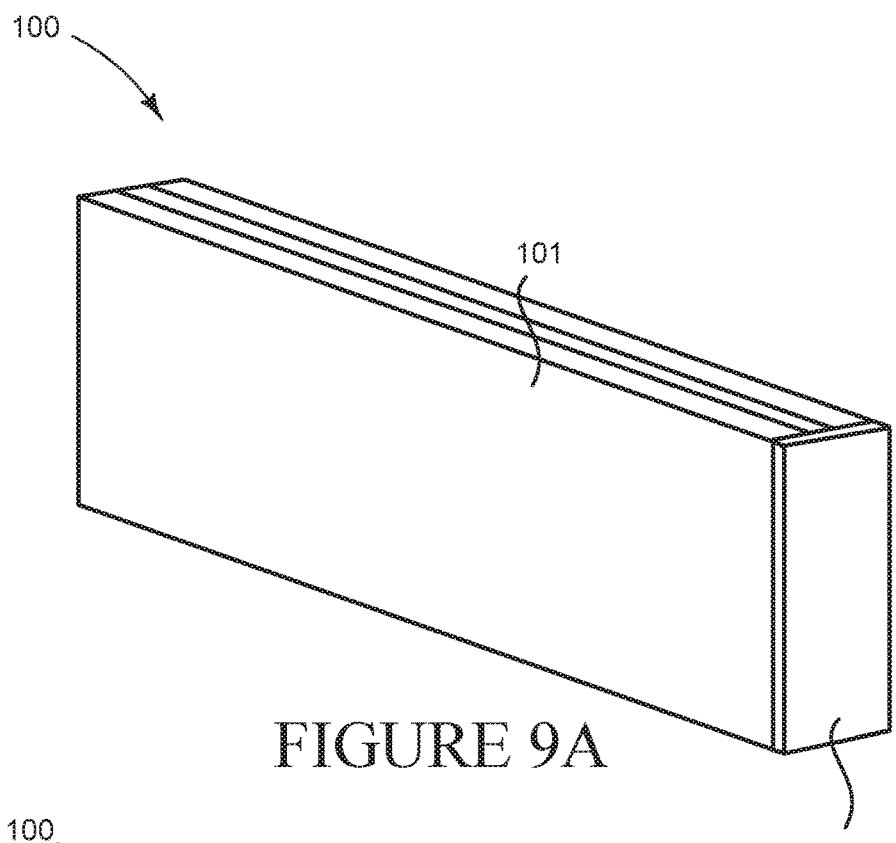
FIGS. 9A-9C are perspective views of several heat pipe configurations for containing an environment within a cavity.
Figure 9B:
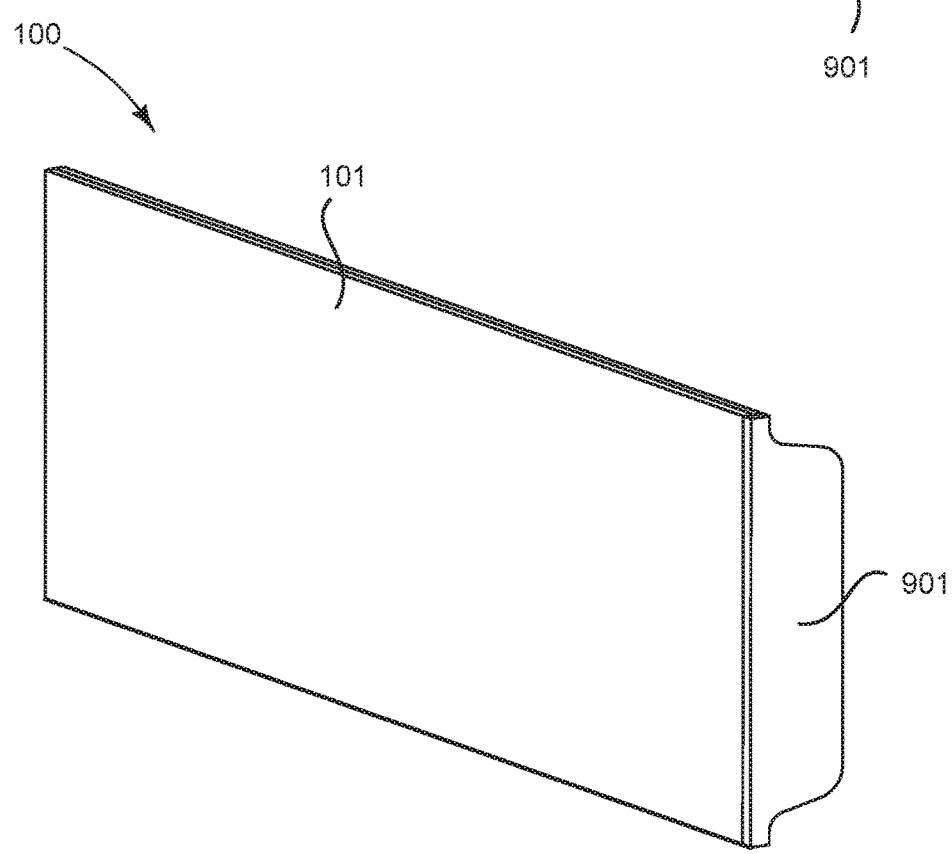
Figure 9C:
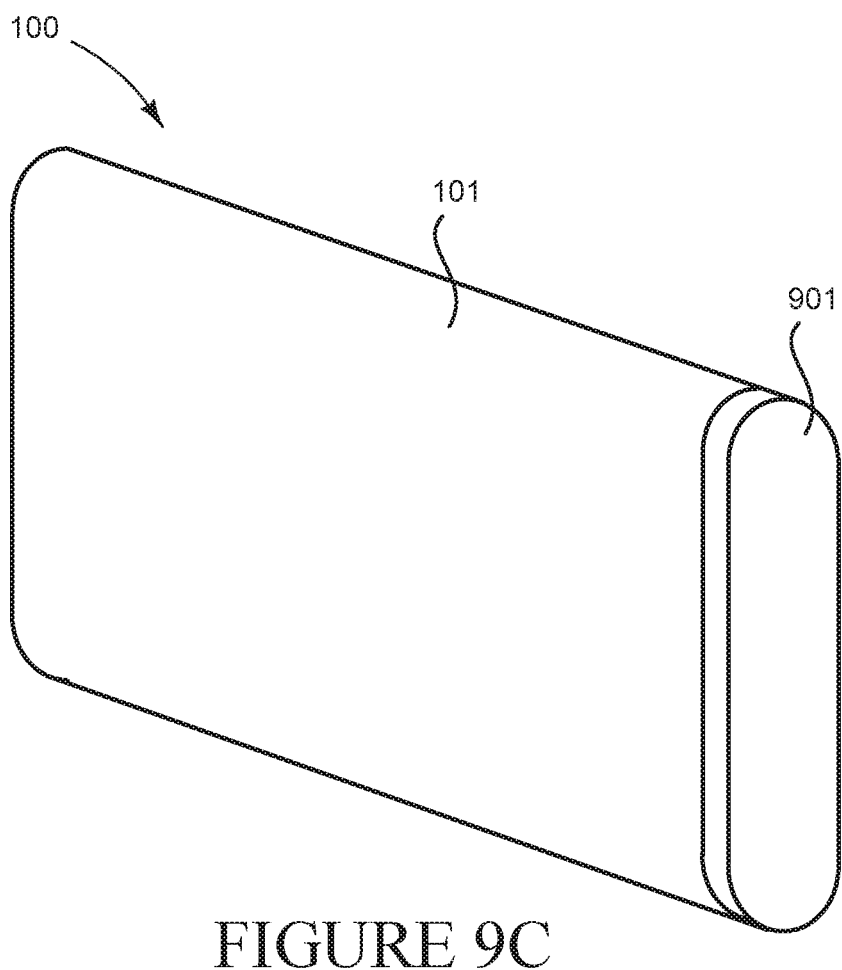

In some configurations, a heat pipe 100 can comprise a cavity 104 configured to maintain a controlled environment, e.g., an environment that includes, but is not limited to, a vacuum, a liquid, or a liquid-gas combination. FIGS. 9A-9C are perspective views of several heat pipe 100 configurations for containing a controlled environment. In such configurations, a heat pipe 100 can include an end section 901 for sealing the cavity 104. The end section 901 can be in any form suitable for maintaining a desired environment within the cavity 104. For instance, the end section 901 can comprise of a metal section sized and configured to seal the cavity 104. In such configurations, the metal section can be secured to the housing 101 of a heat pipe 100 by the use of an adhesive or a method that can involve welding or brazing the end section 901 to a housing 101.

In some configurations, the end section 901 can also be formed by crushing and/or shaping portions of the housing 101 to form a seal capable of maintaining a desired environment within the cavity 104. The end section 901 can also comprise of an adhesive, such as a silicon-based material, for enclosing the cavity 104. Any number of techniques for securing, sealing, and/or shaping the end section 901 can utilize.

As summarized above, a predetermine torque of a heat pipe 100 can depend, at least in part, on one or more dimensions of the heat pipe 100. In some configurations, a length of one or more regions of a heat pipe can influence the predetermine torque of the heat pipe 100.

Figure 10:
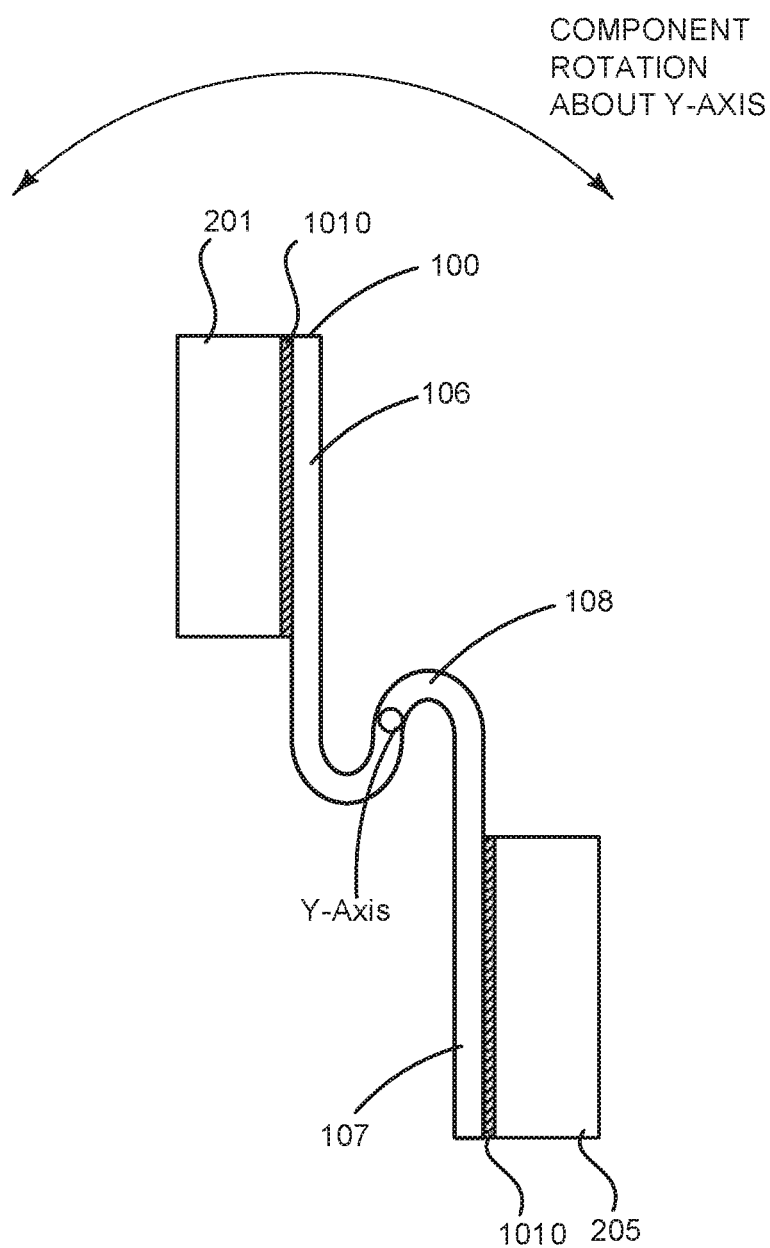
FIG. 10 is a top view of a heat pipe configured with several bends between a first region and a second region.

FIG. 10 is a top view of a heat pipe 100 configured with a number of bends for influencing the length, and thus the predetermine torque, of a heat pipe 100. As shown, the heat pipe 100 comprises a third region 108 positioned between the first region 106 and the second region 107. In this example, the third region 108 comprises two bends to lengthen the third region 108. This example is provided for illustrative purposes and is not to be construed as limiting. It can be appreciated that the pipe 100 can comprise any number of bends in the housing 101 to accomplish a desired torque resistance. In general, the third region 108 is configured with one or more bends to extend a length of the heat pipe, wherein the length of the heat pipe controls the predetermined torque resistance of the heat pipe 100.

FIG. 10 also shows a first component 201 and a second component 205 coupled to the heat pipe 100. This example also illustrates a thermal material 1010, such as a thermal paste or a thermal pad, positioned between the components and the heat pipe 100.

Figure 11:
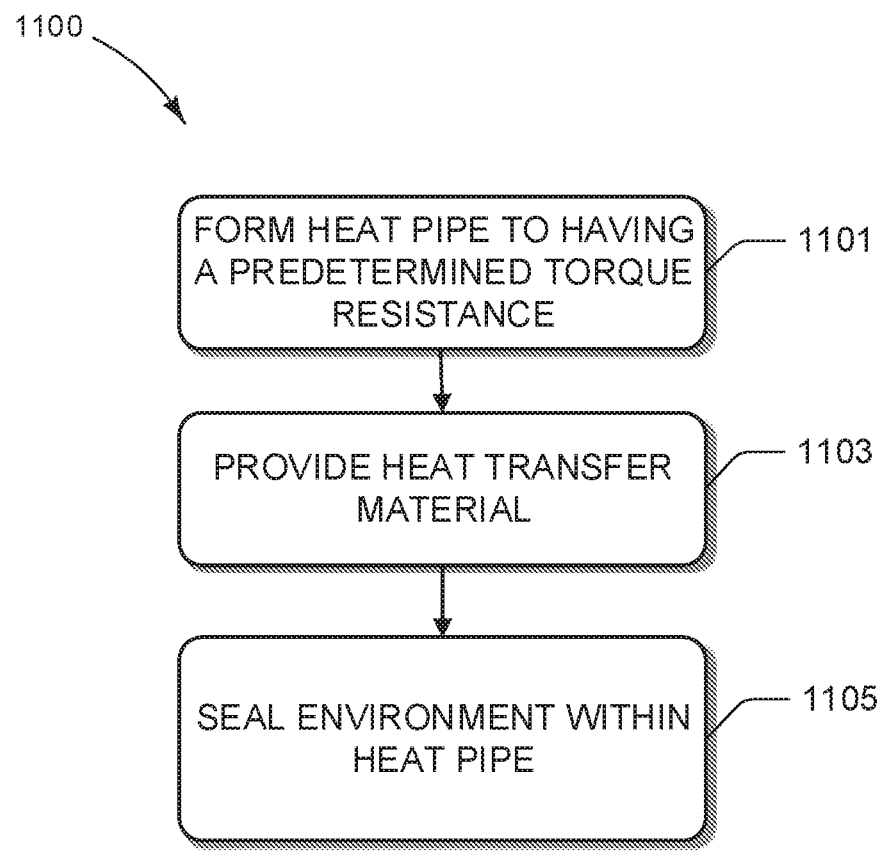
FIG. 11 is a method for manufacturing a heat pipe configured in accordance with the techniques disclosed herein.

Referring now to FIG. 11, aspects of an example process 1100 for manufacturing a heat pipe 100 are shown and described below. Aspects of such techniques, and other techniques disclosed herein, can be used for forming a stand-alone structure that can be placed into a device or other article of manufacture.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated methods can be ended at any time and need not be performed in its entirety.

Operation 1101 includes forming a housing having an outer surface and an inner surface defining a cavity, the housing having a predetermined torque resistance about a first axis (Y-Axis), the first axis perpendicular to a longitudinal axis of the housing. As summarized above, a method of forming the housing can comprise providing a first side having a first thickness and a second side having a second thickness, and fastening the first side to the second side in a manner for forming the cavity, wherein the predetermined torque resistance is based, at least in part, on the first thickness and the second thickness. In another configuration, a method of forming the housing can comprise providing a metal pipe having a predetermined thickness and a predetermined diameter, and shaping the metal pipe such that an inner surface of the metal pipe forms the cavity having a predetermined width, wherein the predetermined torque resistance is based, at least in part, on the predetermined thickness, the predetermined diameter, and the predetermined width of the cavity.

Operation 1103 can include disposing one or more components for transferring heat within the cavity. As summarized above, such techniques can involve a wicking component and a working fluid for causing a capillary action. Operation 1103 can involve sealing an environment within the cavity, such as a vacuum environment or a liquid-based environment. An end section can be created by shaping the housing of the heat pipe or by adding one or more elements, such as a metal section, an adhesive, or a sealant.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
    a first component functioning as a heat source;
    a second component functioning as a heat sink; and
    a heat pipe for coupling the first component to the second component, the heat pipe comprising an outer surface and an inner surface defining a cavity, the heat pipe comprising one or more components within the cavity for transferring heat from a first region to a second region, and wherein a size and a material composition of the heat pipe provides a predetermined torque resistance about an axis (Y-Axis), wherein the first region is coupled to the first component and the second region is coupled to the second component thereby providing a thermal interface between the first component and the second component and hingeably coupling the first component and the second component, and wherein the heat pipe enables the first component or the second component to rotate about the axis with the predetermined torque resistance.

2. The system of claim 1, wherein the first component is coupled to the first region by a first fastener, wherein the second component is coupled to the second region by a second fastener, wherein a position of the axis is between the first fastener and the second fastener.

3. The system of claim 1, wherein the first axis (Y-Axis) is perpendicular to a second axis (X-axis) along a longitudinal length of the heat pipe.

4. The system of claim 1, wherein a height of the heat pipe is 3 mm-5 mm, wherein the height is along the first axis.

5. The system of claim 1, wherein the outer surface and the inner surface define a housing having a thickness within a range of 0.1 mm to 1 mm.

6. The system of claim 1, wherein the heat pipe comprises titanium having a predetermined purity level.

7. The system of claim 1, wherein the heat pipe comprises steel having a predetermined purity level.

8. The system of claim 1, wherein the heat pipe comprises a first material having a predetermined structural performance level and a second material having a predetermined level of thermal conductivity.

9. The system of claim 8, wherein the heat pipe comprises the first material is titanium and the second material is copper.

10. The system of claim 1, wherein a size, a shape, and a material composition of the heat pipe cause the predetermined torque resistance to be within a range of 80-110 Newton-centimeters.

11. The system of claim 1, wherein a size, a shape, and a material composition of the heat pipe cause the predetermined torque resistance to be within a range of 95-105 Newton-centimeters.

12. The system of claim 1, wherein a size, a shape, and a material composition of the heat pipe cause the predetermined torque resistance to be substantially consistent within a predetermined range of rotation.

13. The system of claim 12, wherein the predetermined range of rotation is −30 degrees to 30 degrees or −15 degrees to 15 degrees.

14. The system of claim 1, wherein the heat pipe further comprises a third region between the first region and the second region, wherein the third region is configured with one or more bends to extend a length of the heat pipe, wherein the length of the heat pipe controls the predetermined torque resistance.

* * * * *